United States Patent
Dean et al.

(10) Patent No.: US 7,634,530 B2
(45) Date of Patent: Dec. 15, 2009

(54) DYNAMIC DEFINITION FOR CONCURRENT COMPUTING ENVIRONMENTS

(75) Inventors: Loren Dean, Natick, MA (US); H. Narfi Stefansson, Natick, MA (US)

(73) Assignee: The MathWorks, Inc., Natick, MA (US)

(*) Notice: Subject to any disclaimer, the term of this patent is extended or adjusted under 35 U.S.C. 154(b) by 702 days.

(21) Appl. No.: 11/271,009

(22) Filed: Nov. 10, 2005

(65) Prior Publication Data

US 2007/0130299 A1 Jun. 7, 2007

(51) Int. Cl.
G06F 15/16 (2006.01)

(52) U.S. Cl. .................... 709/201; 709/220; 713/1; 713/2

(58) Field of Classification Search .............. 709/201, 709/220; 713/1, 2
See application file for complete search history.

(56) References Cited

U.S. PATENT DOCUMENTS

| | | | | |
|---|---|---|---|---|
| 5,050,088 A * | 9/1991 | Buckler et al. | ............... | 700/96 |
| 5,909,542 A * | 6/1999 | Paquette et al. | ............. | 709/203 |
| 6,026,397 A * | 2/2000 | Sheppard | ................... | 707/5 |
| 6,112,225 A * | 8/2000 | Kraft et al. | ................. | 709/202 |
| 6,647,408 B1 * | 11/2003 | Ricart et al. | ............... | 718/105 |
| 6,907,572 B2 * | 6/2005 | Little et al. | ................ | 715/762 |
| 6,925,642 B1 * | 8/2005 | Commander | ............... | 718/104 |
| 6,988,139 B1 * | 1/2006 | Jervis et al. | ............... | 709/226 |
| 7,103,628 B2 * | 9/2006 | Neiman et al. | ............. | 709/201 |
| 7,243,121 B2 * | 7/2007 | Neiman et al. | ............. | 709/201 |
| 7,299,274 B2 * | 11/2007 | Rajarajan et al. | ............ | 709/223 |
| 7,376,693 B2 * | 5/2008 | Neiman et al. | ............. | 709/201 |
| 7,509,244 B1 * | 3/2009 | Shakeri et al. | ................. | 703/7 |
| 2002/0123671 A1 * | 9/2002 | Haaland | .................... | 600/300 |
| 2003/0081790 A1 * | 5/2003 | Kallahalla et al. | ........... | 380/281 |
| 2003/0120701 A1 * | 6/2003 | Pulsipher et al. | ............ | 709/102 |
| 2003/0191795 A1 * | 10/2003 | Bernardin et al. | ........... | 709/105 |
| 2003/0210275 A1 * | 11/2003 | Draschwandtner et al. | .. | 345/810 |
| 2003/0237084 A1 * | 12/2003 | Neiman et al. | ............. | 718/102 |
| 2004/0230637 A1 * | 11/2004 | Lecoueche et al. | .......... | 709/200 |
| 2005/0125798 A1 * | 6/2005 | Peterson | ..................... | 718/105 |
| 2005/0149545 A1 * | 7/2005 | Zenz | ........................... | 707/101 |
| 2005/0188075 A1 * | 8/2005 | Dias et al. | .................... | 709/224 |
| 2006/0168347 A1 * | 7/2006 | Martin | ....................... | 709/246 |

(Continued)

OTHER PUBLICATIONS

Flanagan, David et al., "Java Enterprise, in a Nutshell, a Desktop Quick Reference," O'Reilly & Associates, Inc., Paula Ferguson, ed. (1999).

(Continued)

Primary Examiner—Saleh Najjar
Assistant Examiner—Waseem Ashraf
(74) Attorney, Agent, or Firm—Lahive & Cockfield, LLP; Kevin J. Canning (57) ABSTRACT

The present invention provides a method and system for dynamically configuring computing environment for concurrent computing. Given a specific configuration and/or the number of concurrent computing labs at start up of an executable process, the executable process may be set up for parallel computing environment using local resources and/or remote resources. A configuration is used to store all configuration information so that a one-string configuration may be used. The one-string configuration may be used at start up of an executable process or may be provided as an argument to a function.

4 Claims, 6 Drawing Sheets

U.S. PATENT DOCUMENTS

2006/0206912 A1* 9/2006 Klarfeld et al. ............... 725/40
2007/0083620 A1* 4/2007 Pedersen .................... 709/219
2007/0276930 A1* 11/2007 Dean et al. ................. 709/222

OTHER PUBLICATIONS

Hamilton, Dave et al., "Unleashed, Programming Windows NT4," SAMS Publishing (1996).

Hunter, Jason et al., "Java Servlet Programming," O'Reilly & Associates, Inc., Paula Ferguson, ed. (1998).

International Preliminary Report on Patentability for Application No. PCT/US2006/044076, dated Nov. 27, 2007.

Frey, James et al., "Condor-G: A Computation Management Agent for Multi-Institutional Grids," *Proceedings of the 10th IEEE Symposium on High Performance Distributed Computing*, (2001).

Goux, Jean-Pierre et al., "Metacomputing and the Master-Worker Paradigm," retrieved online at http://citeseer.ist.psu.edu/goux00metacomputing.html (2000).

Kulkarni, Sanjeev, "An Intelligent framework for Master-Worker Applications in a Dynamic Metacomputing Environment," pp. 1-15 (2001).

Raman, Rajesh et al., "Policy Driven Heterogeneous Resource Co-Allocation with Gangmatching," *Proceedings, 12th International Symposium on High Performance Distributed Computing*, pp. 80-89 (2003).

Roy, Alain et al., "Condor and Preemptive Resume Scheduling," *Grid Resource Management: State of the Art and Future Trends*, Klumer Academic Publishers, Jarek Nabrzyski, Ed., pp. 135-144 (2003).

Thain, Douglas et al., "Distributed Computing in Practice: The Condor Experience," *Concurrency: Pract. Exper.*, pp. 0-20 (2004).

Husbands, Parry Jones Reginald, "Interactive Supercomputing," pp. 1-96 (1999).

* cited by examiner

| Configurable Items | Configurable Properties |
|---|---|
| Resource | Type<br>Name<br>HostName<br>LookupURLs |
| Scheduler | DataLocation<br>HasSharedFilesystem<br>ClusterMatlabRoot<br>SubmitArguments<br>SubmitFcn |
| Job | PathDependencies<br>FileDependencies<br>Timeout<br>RestartWorker<br>MaximumNumberOfWorkers<br>MinimumNumberOfWorkers |
| Task | Timeout<br>CaptureCommandWindowOutput<br>TaskFinishedFcn |

DYNAMIC DEFINITION FOR CONCURRENT COMPUTING ENVIRONMENTS

TECHNICAL FIELD

The present invention generally relates to technical computing, and, more particularly, concurrent technical computing among multiple computing units.

BACKGROUND OF THE INVENTION

MATLAB® is a product of The MathWorks, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization and algorithm development. MATLAB® integrates numerical analysis, matrix computation, signal processing, and graphics in an easy-to-use environment where problems and solutions are expressed in familiar mathematical notation, without traditional programming. MATLAB® is used to solve complex engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming such as Fortran or C.

As a desktop application, MATLAB® allows scientists and engineers to interactively perform complex analysis and modeling in their familiar workstation environment. However, a single workstation can be limiting to the size of the problem that can be solved, because of the relationship of the computing power of the workstation to the computing power necessary to execute computing intensive iterative processing of complex problems in a reasonable time. For example, a simulation of a large complex aircraft model may take a reasonable time to run with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired, and the single computer would take an unreasonable or undesirable amount of time to perform these simulations. In this case, the single computer would be allocated full-time to performing the computation while many computing resources on the network may be idle. Additionally, the benefit of the interactive features of the software is reduced as the computation time increases.

Hence, distributed computing is very useful for distributing tasks to multiple computing resources, especially for a computationally intensive problem. However, most technical computing software was not initially designed for distributed computing. Now, with the availability and possibility of distributed computing, software developers face the problem of how to configure the distributed computing environment and transform functions and codes initially designed for a desktop application to work in the distributed computing environment. Furthermore, the complexity of this transform increases as software developers want to allow users to setup their own distributed computing environment, but at the same time minimize the amount of changes to the existing function signatures and minimize the amount of information that users need to enter about their environment.

SUMMARY OF THE INVENTION

The present invention provides a method and system for dynamically configuring a distributed or parallel technical computing environment. In one embodiment, a method for dynamically configuring information regarding computing environment for concurrent computing is introduced. The method includes the steps of providing a first executable process for execution in a concurrent computing environment and providing a configuration at start up of the first executable process, wherein the configuration specifies a configuration of the concurrent computing environment. Configurations allow one string to represent all of the setup that needs to occur for a concurrent computing environment. Typically, to setup a concurrent computing environment, computing resources needs to be identified or searched given a specific category. Additionally, a scheduler or job manager is often used to manage job creation and distribution. Furthermore, there is also setup needed for job objects. Hence, using configurations simplifies the interface to setup a concurrent computing environment and it is also convenient that such information only needs to be entered once until a user chooses to change the configuration of the concurrent computing environment. The method also includes the step of executing the first executable process to use the configuration for configuring the concurrent computing environment.

In one aspect of the present invention, the executable process invokes a second executable process to setup the concurrent computing environment according to the configuration. In a further aspect of the present invention, the method further includes the step of creating the configuration before start up of the executable process. In another aspect of the present invention, the method further includes the step of providing a specified number of the plurality of concurrent computing labs at start up of the executable process. In still another aspect of the present invention, the method further includes the step of executing the executable process to cause a plurality of concurrent computing labs in the concurrent computing environment to be arranged according to the configuration. In yet another aspect of the present invention, the method further includes the step of establishing communication channels among the plurality of concurrent computing labs according to the configuration in the configuration. In still another aspect of the present invention, the configuration is provided using a command line. In yet another aspect of the present invention, the configuration is provided using a graphical user interface. In still another aspect of the present invention, the configuration includes information of at least one of computing resource, a scheduler, a job, and a task. In a further aspect of the present invention, the scheduler is a generic scheduler. In yet another aspect of the present invention, the scheduler is a third-party scheduler with respect to the executable process. In still another aspect of the present invention, the executable process is a MATLAB based software application.

In another embodiment of the present invention, a method for creating a configuration for a setup of a concurrent computing environment is provided. The method includes the step of programmatically configuring a setup of a concurrent computing environment and saving the setup of the concurrent computing environment in a configuration.

In one aspect of the present invention, the step of configuring further includes the steps of using a first configuration to configure the setup of the concurrent computing environment and programmatically altering the setup of the concurrent computing environment. In another aspect of the present invention, the step of configuring is performed without the use of a configuration.

In yet another embodiment of the present invention, a method of simplifying computing environment settings for a function is provided. The method includes the steps of providing an executable process capable of submitting a job to a cluster environment and providing a function that can be executed in the cluster environment. The method also includes the step of providing a one-string configuration argument as an input to the function for configuring the cluster environment to compute the function, wherein the one-string configuration argument is the only input for configuring the cluster environment and the one-string configuration argument consists of a name of a configuration, the configuration specifying a setup of the cluster environment. The method further includes the step of executing the function using the configured cluster environment. In one aspect of the present invention, the method further includes the step of submitting a first job to be executed in the cluster environment, wherein the first job comprises execution of the function.

In still another embodiment of the present invention, a computing device including a storage medium storing a method for dynamically configuring computing environment for concurrent computing is introduced. The method includes the steps of providing a first executable process for execution in a concurrent computing environment and providing a configuration at start up of the executable process, wherein the configuration specifies a setup of the concurrent computing environment. The method also includes the step of executing the first executable process to use the configuration for configuring the concurrent computing environment.

In yet another embodiment of the present invention, a computing device including a storage medium storing a method for creating a configuration for a setup of a concurrent computing environment is provided. The method includes the step of programmatically configuring a setup of a concurrent computing environment and saving the setup of the concurrent computing environment in a configuration.

In still another embodiment of the present invention, a computing device including a storage medium storing a method for simplifying computing environment settings for a function is provided. The method includes the steps of providing an executable process capable of submitting a job to a cluster environment and providing a function that can be executed in the cluster environment. The method also includes the step of providing a one-string configuration argument as an input to the function for configuring the cluster environment to compute the function, wherein the one-string configuration argument is the only input for configuring the cluster environment and the one-string configuration argument consists of a name of a configuration, the configuration specifying a setup of the cluster environment. The method further includes the step of executing the function using the configured cluster environment.

In still another aspect of the present invention, a system to operate a plurality of concurrent computing labs in a concurrent computing environment is introduced. The system includes a concurrent computing client receiving a configuration for a concurrent computing environment for execution of an executable process and executing the executable process to cause the setup of the concurrent computing environment according to the configuration. The system further includes a scheduler, in communication with the concurrent computing client, receiving a job from the concurrent computing client, the scheduler communicating a task associated with the job to one or more concurrent computing labs. The system also includes a first concurrent computing lab, in communication with the scheduler, receiving the task from the scheduler and performing the task in the concurrent computing environment.

In one aspect of the present invention, the concurrent computing client includes a concurrent computing lab. In another aspect of the present invention, the concurrent computing client, the scheduler, and the first concurrent computing lab resides on different computing device. In a further aspect of the present invention, the scheduler is a third party scheduler with respect to the executable process.

BRIEF DESCRIPTION OF FIGURES

The foregoing and other objects, aspects, features, and advantages of the invention will become more apparent and may be better understood by referring to the following description taken in conjunction with the accompanying drawings, in which.

DETAILED DESCRIPTION

The illustrative embodiments of the present invention provides for dynamic configuration of a concurrent computing environment. By specifying a configuration and/or the number of concurrent computing labs, the present invention enables dynamic configuration of a concurrent computing environment. A concurrent computing lab is a computing resource that performs distributed computing or parallel computing. A computing resource can be a processor, a computer system, or other hardware with computational capabilities. The present invention also provides a solution to simplify computing environment settings for a function such that all the configuration information of the computing environment can be submitted via only a string. The present invention provides software developers with a consistent way to transform software tools originally implemented as a single desktop application to ones that may be used in a concurrent computing environment and at the same time enable users to configure their own computing environment without changing too much of the function signatures of the original software tools. It greatly simplifies the process of distributing tasks of an executable process in the concurrent computing environment.

The following illustrative embodiments will be described solely for illustrative purposes relative to a MATLAB®-based technical computing environment. Although the illustrative embodiment will be described relative to a MATLAB®-based application, one of ordinary skill in the art will appreciate that the present invention may be applied to parallel or distributed processing of technical computing tasks with other technical computing environments, such as technical computing environments using software products of LabVIEW® or MATRIXx from National Instruments, Inc., or Mathematical® from Wolfram Research, Inc., or Mathcad of Mathsoft Engineering & Education Inc., or Maple™ from Maplesoft, a division of Waterloo Maple Inc.

Figure 1:
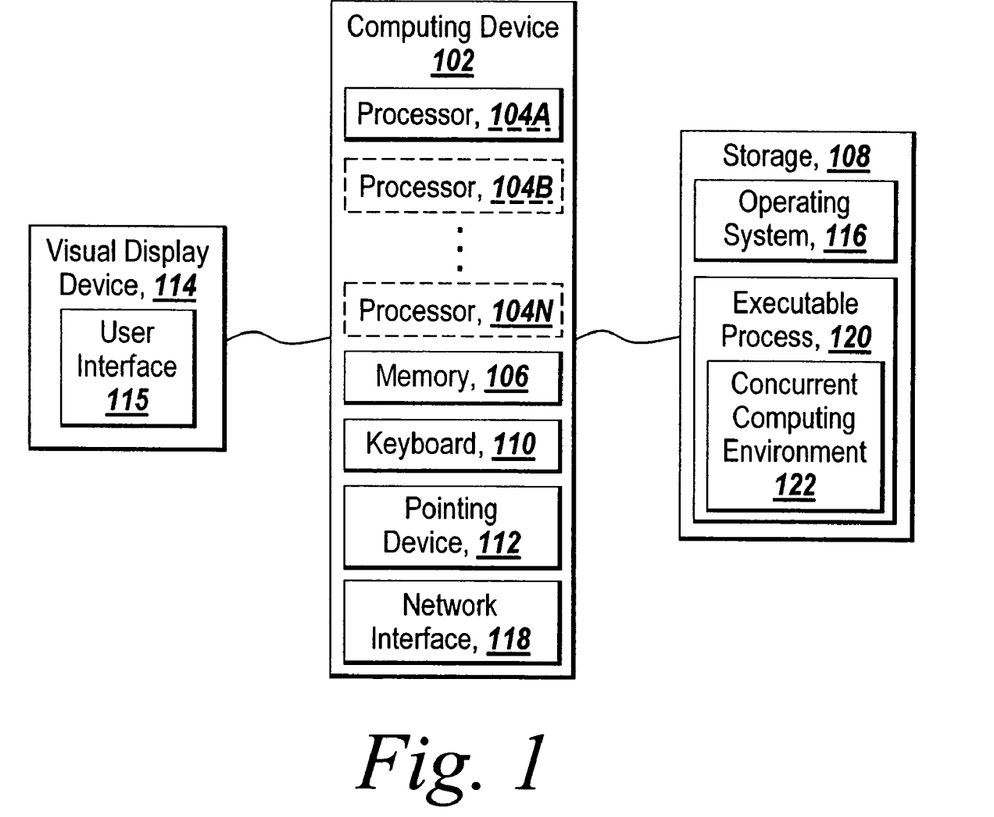
FIG. 1 is a block diagram of a computing device suitable for practicing an embodiment of the present invention.

FIG. 1 depicts an environment suitable for practicing an illustrative embodiment of the present invention. The environment includes a computing device 102 having memory 106, on which software according to one embodiment of the present invention may be stored, processor 104A, and optionally, processors 104B-N for executing software stored in the memory 106, and other programs for controlling system hardware. Each of the processors 104A-N can be a single or multiple core processor. The memory 106 may comprise a computer system memory or random access memory such as DRAM, SRAM, EDO RAM, etc. The memory 106 may comprise other types of memory as well, or combinations thereof. A user may interact with the computing device 102 through a visual display device 114 such as a computer monitor, which may include a user interface 115. The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may further comprise a storage device 108, such as a hard-drive or CD-ROM, for storing an operating system 116 and other related software, and for storing executable process 120, such as parallel computing with MATLAB® or distributed computing with MATLAB®. Executable process 120 can be, but not limited to, an application, a program, a module, or a script. Executable process 120 may include a concurrent computing environment 122 to enable concurrent computing on the computing device 102. Additionally, the operating system 116 and executable process 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein.

Figure 2:
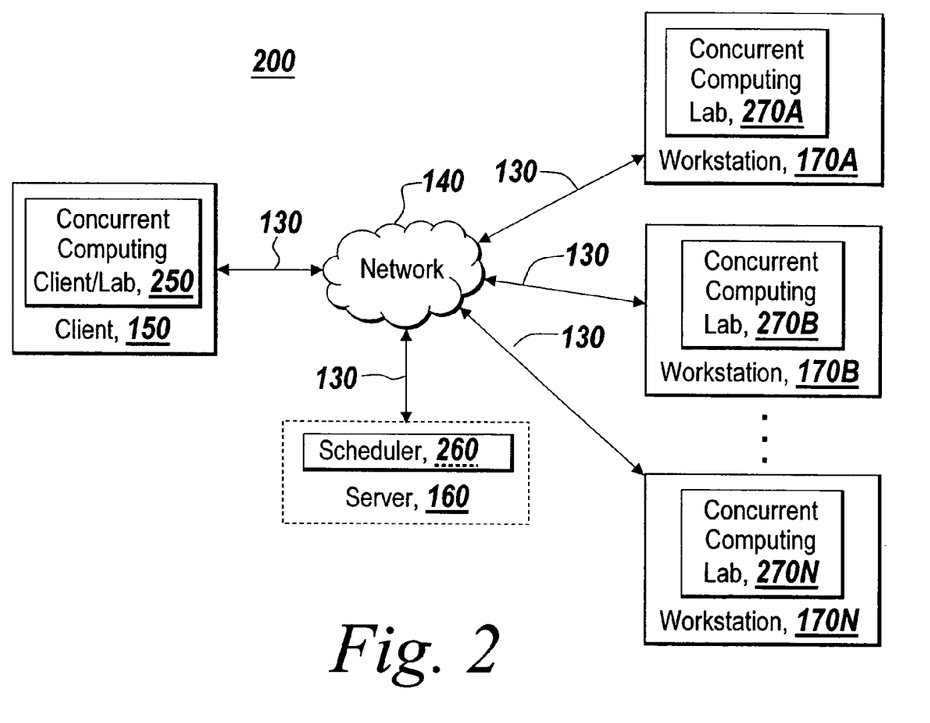
FIG. 2 is a block diagram of a concurrent computing system including more than one computing device for practicing an embodiment of the present invention.

FIG. 2 depicts an illustrative embodiment of a concurrent computing system 200 that is suitable to practice with the present invention. In brief overview, the system 200 comprises a concurrent computing client 250 running on a client 150 and after concurrent computing client 250 receives information on the configuration of the concurrent computing environment and optionally the number of concurrent computing labs needed, concurrent computing labs 270A-N on workstations 170A-N are created and the concurrent computing environment is configured using the configuration information. The concurrent computing client 250 is in communication with the concurrent computing labs 170A-N through network communication channels 130 over a network 140. One of ordinary skill in the art will appreciate that workstations 170A-N, server 160, and client 150 may have one or more concurrent computing lab.

In one embodiment of the present invention, once concurrent computing labs 270A-N are created, executable process 120 setup communication channels among the concurrent computing labs 270A-N. A file may be used to store identification information of all concurrent computing labs, such as IP addresses, rankings, and assigned identification numbers. All concurrent computing labs may have a copy of this file so that every lab knows who else is in the concurrent computing environment. The concurrent computing labs may communicate with each other by sending and receiving messages using the identification information. In one embodiment, the concurrent computing labs may interface via socket based communications over a protocol including but not limited to, TCP/IP, Infiniband, and Myrinet, implementing a custom message specification or other available message communications projects that allow the concurrent computing labs to send and receive messages. In another embodiment, Message Passing Interface (MPI) may be used to setup the communication among the concurrent computing labs. MPI is a de facto standard for communication among the nodes running a parallel program on a distributed memory system. Implementation of the MPI specification permits programs with separate address spaces to synchronize with one another and move data from the address space of one process to that of another by sending and receiving messages. One of ordinary skill in the art will appreciate that the present invention is not limited to the use of MPI, but other interfaces, such as Remote Method Invocation (RMI) may be used with the present invention.

The concurrent computing client 250 can be a technical computing software application that provides a technical computing and/or graphical modeling environment for generating block diagram models and to define mathematical algorithms for simulating models. The concurrent computing client 250 may include all or a portion of the functionality provided by the stand-alone desktop application of MATLAB®. Additionally, the concurrent computing client 250 can be any of the software programs available in the MATLAB® product family. Furthermore, the concurrent computing client 250 can be a custom software program or other software that accesses functionalities of software programs in the MATLAB® product family via an interface, such as an application programming interface, or by other means. One of ordinarily skill in the art will appreciate the various combinations of client types may access the functionalities of the system.

In one embodiment of the present invention, concurrent computing client 250 is also a concurrent computing lab. In such a configuration, communication channels are setup among all the concurrent computing labs (concurrent computing client 250 and concurrent computing labs 270A-N). Each of the concurrent computing labs (including the concurrent computing client 250) has its local copy of a computer program that is executed in the corresponding concurrent computing labs, so there is no main concurrent computing lab that distributes executions to the other concurrent computing labs. The concurrent computing client 250 will additionally have the functionality to accept inputs and/or commands from a user related to the computer program using a tool such as an Integrated Development Environment (IDE). The concurrent computing client 250 and concurrent computing labs 270A-N can be configured to perform distributed computing or parallel computing.

In another embodiment of the present invention, concurrent computing client 250 is not involved in the concurrent processing of tasks. The concurrent computing labs 270A-N are setup after concurrent computing client 250 uses information regarding the number of labs to set up for concurrent computing. Once set up, communication channels are created among the concurrent computing labs 270A-N. In one embodiment of the present invention, each of the concurrent computing labs 270A-N has its local copy of a computer program that is executed in the corresponding concurrent computing labs. Concurrent computing labs 270A-N collaborate with each other and process tasks given by the concurrent computing client 250.

In one embodiment of the present invention, functions can be defined, by the concurrent computing client 250 with an application programming interface and/or programming language, representing a technical computing task to be executed by either a technical computing environment local to the client 150, or remote on the workstations 270A-N. Tasks can be declared on a concurrent computing client 250 and additionally organized into jobs. A job is a logical unit of activities, or tasks that are processed and/or managed collectively. A task defines a technical computing command, such as a MATLAB® command, to be executed, and the number of arguments and any input data to the arguments. A job is a group of one or more tasks.

In one aspect of the present invention, a task can be directly distributed by the concurrent computing client 250 to one or more computing resources, such as workstations 170A-N. A computing resource performs technical computing on a task and may return a result to the concurrent computing client 250.

The programming language of the concurrent computing client 250 includes mechanisms to define a task to be distributed and to communicate the task to the concurrent computing labs 270A-N on the workstations 170A-N, or alternatively, on the client 150. Also, the application programming interface and programming language of the concurrent computing client 250 includes mechanisms to receive results from the execution of technical computing of the task from concurrent computing labs 280A-N. For example, the concurrent computing client 250 may declare a variable to hold a result returned from the technical computing labs 270A-N performing technical computing of a function involving distributed arrays.

The distributed functionality features of the programming languages of concurrent computing client 250 allows the concurrent computing client 250 to use the computing resources that may be available from concurrent computing labs 270A-N on the workstations 170A-N to perform technical computing of tasks. This frees up the concurrent computing client 250 to perform other tasks, or the client computer 150 to execute other software applications.

Each of the concurrent computing labs 270A-N of the system 200 can be, but not limited to, a technical computing software application that provides a technical computing environment for performing technical computing of tasks, such as those tasks defined or created by the concurrent computing client 250. Each of the concurrent computing labs 270A-N can also be an instance of executable process 120, a module, a service, a software component, or a session. Each of the concurrent computing labs 270A-N includes support for technical computing of functions defined in the programming language of MATLAB®. Concurrent computing labs 270A-N can include all the functionality and software components of the concurrent computing client 250, or it can just include those software components it may need to perform technical computing of tasks it receives for execution. The concurrent computing labs 270A-N may be configured to and capable of running any of the modules, libraries or software components of the MATLAB® product family. As such, the concurrent computing labs 270A-N may have all or a portion of the software components of MATLAB® installed on the workstation 170, or alternatively, accessible on another system in the network 140. The concurrent computing labs 270A-N have mechanisms to receive a task distributed from the concurrent computing client 250. The concurrent computing labs 270A-N are capable of performing technical computing of the task as if the concurrent computing client 250 was performing the technical computing in its own technical computing environment. The concurrent computing labs 270A-N also have mechanisms, to return a result generated by the technical computing of the task to the concurrent computing client 250.

The concurrent computing labs 270A-N can be available on an as needed basis to the concurrent computing client 250. When not performing technical computing of tasks from the concurrent computing client 250, the workstations 170A-N of the concurrent computing labs 270A-N can be executing other software programs, or the concurrent computing labs 270A-N can perform technical computing of tasks from other concurrent computing clients.

In another aspect of the present invention, the system includes a server 160 comprises a scheduler 260. The scheduler 260 can be a scheduler provided with executable process 120, a generic scheduler, or a third-party scheduler that is designed and provided a company or individual that does not provide executable process 120. For example, given that executable process 120 is parallel computing with MATLAB® by The MathWorks, Inc. of Natick, Mass., a third-party scheduler can be MPI Exec, LSF, Condor, Microsoft Compute Cluster Server, or PBS. The server 160 communicates over a network communication channel 130 on the network 140 to the workstations 170A-N. One of ordinary skill in the art will appreciate that any of the workstations 170A-N may include more than one technical computing lab to practice the present invention. Additionally, client 150 and server 160 may also include one or more concurrent computing labs.

The scheduler 260 comprises one or more application software components to provide for the automatic distribution of tasks from the concurrent computing client 250 to one or more of the concurrent computing labs 270A-N. The scheduler 260 allows the concurrent computing client 250 to delegate the management of task distribution to the scheduler 260. The scheduler may also set up for concurrent computing client 250 the concurrent computing labs 270A-N by using the information received from the concurrent computing client 250 regarding the number of concurrent computing labs needed and other configuration information. Hence, the concurrent computing client 250 does not need to know the specifics of the concurrent computing labs 270A-N. The concurrent computing client 250 can define a function to submit the task to the scheduler 260, and get a result of the task from the scheduler 260. As such, the scheduler 260 provides a level of indirection between the concurrent computing client 250 and the concurrent computing labs 270A-N.

This eases the distributed programming and integration burden on the concurrent computing client 250. The concurrent computing client 250 does not need to have prior knowledge of the availability of the workstations 170A-N. For multiple task submissions from the concurrent computing client 250, the scheduler 260 can manage and handle the delegations of the tasks to the concurrent computing labs 270A-N and hold the results of the tasks on behalf of the concurrent computing client 250 for retrieval after the completion of technical computing of all the tasks distributed by concurrent computing client 250. In an alternative implementation, the concurrent computing labs 270A-N may provide concurrent computing client 250 directly the results of the tasks assigned to concurrent computing labs 270A-N by the scheduler 260. The scheduler 260 can further include an object-oriented interface to provide control of delegating tasks and obtaining results in the system 200. The scheduler 260 also provides an interface for managing a group of tasks collectively as a single unit called a job, and on behalf of a concurrent computing client 250, submitting those tasks making up the job, and obtaining the results of each of the tasks until the job is completed. One of ordinarily skill in the art will recognize the functions and operations of the scheduler 260 can be separated into various software components, applications and interfaces. Additionally, the functions and operations of the scheduler 260 may reside on either the concurrent computing client 250 or one of the concurrent computing labs 270A-N instead of the server 160.

Additionally, each of the client 150, the server 160, and the workstations 170A-N can be running the same or different operating systems with the same or different processors. For example, the client 150 can running Microsoft® Windows, the server 160 can be running a version of Unix, and the workstations 170A-N a version of Linux. Alternatively, each of the client 150, the server 160 and the workstations 170A-N can be running Microsoft® Windows®. One of ordinarily skill in the art will recognize the various combinations of operating systems and processors that can be running on any of the computing devices (client 150, server 160, workstations 170A-N).

Figure 3:
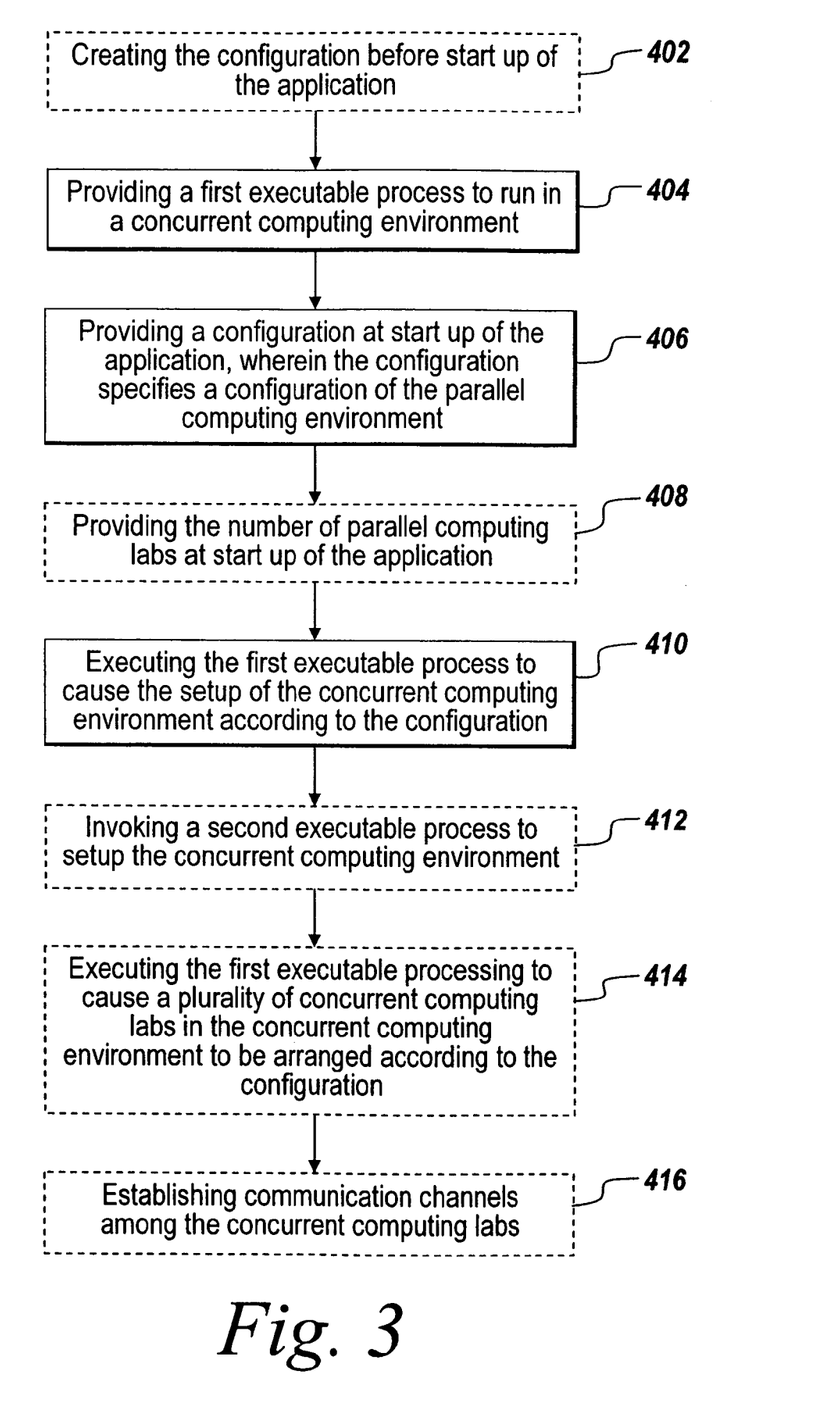
FIG. 3 is a flowchart illustrating the steps taken to practice one embodiment of the present invention in a networked system.
Figure 5:
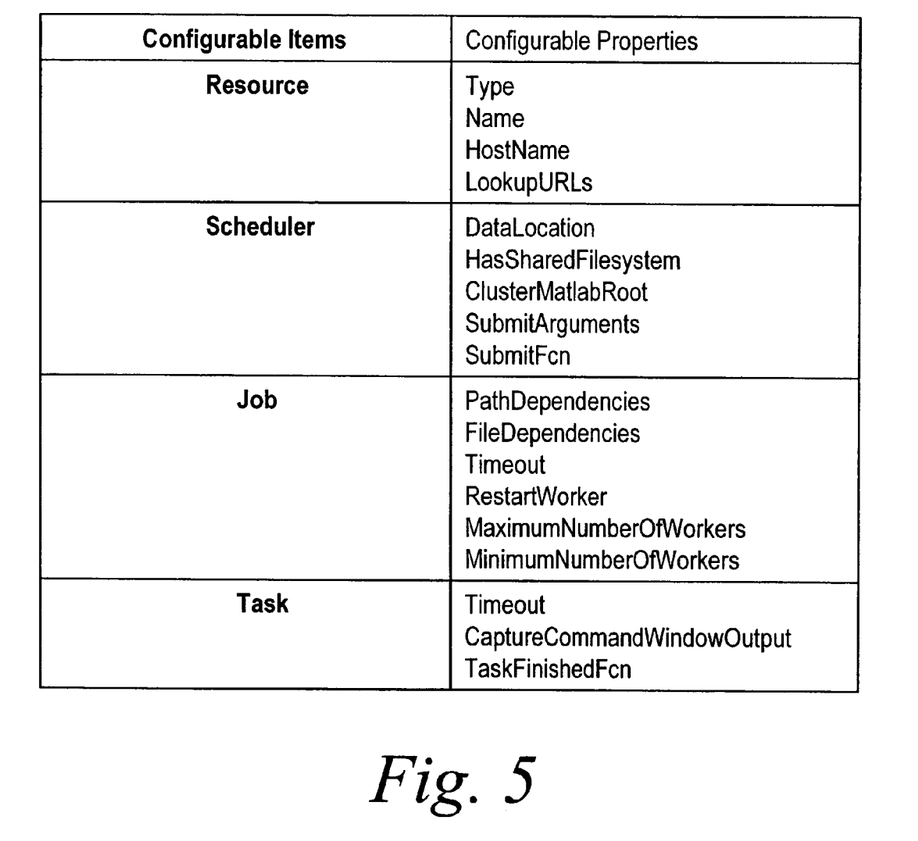
FIG. 5 is a table showing exemplary configurable properties of a concurrent computing environment.

FIG. 3 depicts a flowchart illustrating steps to taken to practice one embodiment of the present invention using the system 200 as shown in FIG. 2. A user may create at step 402 a custom configuration for setting up a preferred concurrent computing environment. At step 404, a first executable process is provided and it is capable of running in a concurrent computing environment. A configuration is provided at start up of the executable process in step 406 so that a concurrent computing environment may be set up according to the configuration specified in the configuration. Configuration can be stored in a number of different places including, but not limited to, memory, a file, a database, or a preference property of executable process 120. A configuration may include one or more property-value (PV) pairs, where every property is assigned a specific value. FIG. 5 shows a table of exemplary configurable properties. Configurable properties that can be included in a configuration include, but not limited to, properties of computing resources (type, name, hostname, and/or URLs), properties of schedulers (data location, shared file system, cluster root, argument submission, and/or function submission), properties of job (path dependencies, file dependencies, timeout, restart, maximum number of computing resources, and/or minimum number of computing resources), and properties of tasks (timeout, output of command window, and/or task finished indicator).

A configuration may be provided using a command line flag at start up of the executable process. Alternatively, a configuration may be provided via a graphical user interface. Because all of the configuration information of the computing environment is stored in the configuration, a single string may be used to represent and name the configuration. Hence, the configuration may be referred to and retrieved by its name. Hence users can reuse the configuration at several different occasions and do not need to enter configuration information for the same computing environment over and over again, which is cumbersome and error prone. In one aspect of the present invention, more than one configuration may be provided. In such a case, if there is conflicting information regarding any configurable properties, the last value that a configuration property is assigned to will be used in setting up the computing environment.

After specifying the configuration at step 406, a user can optionally provide a specified number of the multiple concurrent computing labs that the user wishes to use in the concurrent computing environment at step 408. Similarly, the number of concurrent computing labs may be specified using a command line or via a graphical user interface before start up of the executable process. The first executable process is then executed in step 410 to use the configuration for configuring the concurrent computing environment according to the configuration information in the configuration and the number of concurrent computing labs if specified. In one embodiment, the first executable process invokes a second executable process to setup the concurrent computing environment in step 412. In another embodiment of the present invention, the first executable process is executed in step 414 to cause multiple concurrent labs in the concurrent computing environment to be arranged according to the configuration. Once the concurrent computing labs are set up, communication channels may be established among the concurrent computing labs in step 416. One of ordinary skill in the art will appreciate that one or more executable processes can carry out the different steps of the present invention, and the present invention is not limited to a specific process carrying out a specific step.

Figure 4A:
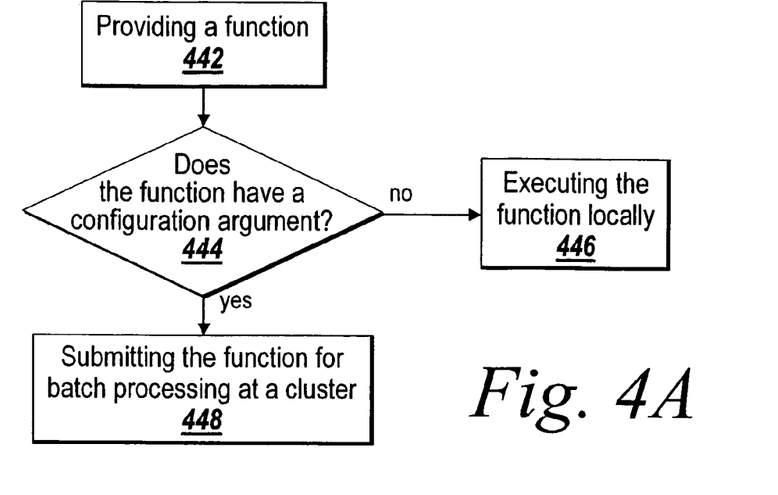
FIG. 4A is a flow chart illustrating the steps taken to practice one embodiment of the present invention in a cluster environment.

The present invention of one-string configuration is not only useful during start up of an executable process but it is also useful for automatically creating and submitting batch jobs in a function call. Batch jobs are used herein to refer to tasks submitted by an instance of the executable process to one or more other computing resources that has at least a part of the functionality of the executable process but the instance of the executable process does not participate in the execution of the tasks. FIG. 4A depicts a flowchart illustrating steps taken to practice one embodiment of the present invention. In step 442, a function is provided. Executable process 120 then checks if the function has a configuration argument in step 444. If the function does not have a configuration argument, the function is executed locally in step 446. On the other hand, if the function does have a configuration argument, the function is submitted to a cluster for batch processing in step 448. For example, a standard function call f(x) without any configuration argument will cause the function to be executed locally by the executable process 120, whereas f(x,config) will signal the executable process 120 to automatically create and submit the function to be executed in a cluster environment having one or more computing resources. One of ordinary skill in the art will appreciate that the present invention allows the cluster environment to be set up via the configuration argument providing a configuration such that distributed computing or concurrent computing may be used to execute the batch jobs. A scheduler, such as scheduler 260, may be used with the present invention to submit jobs to the cluster environment.

Figure 4B:
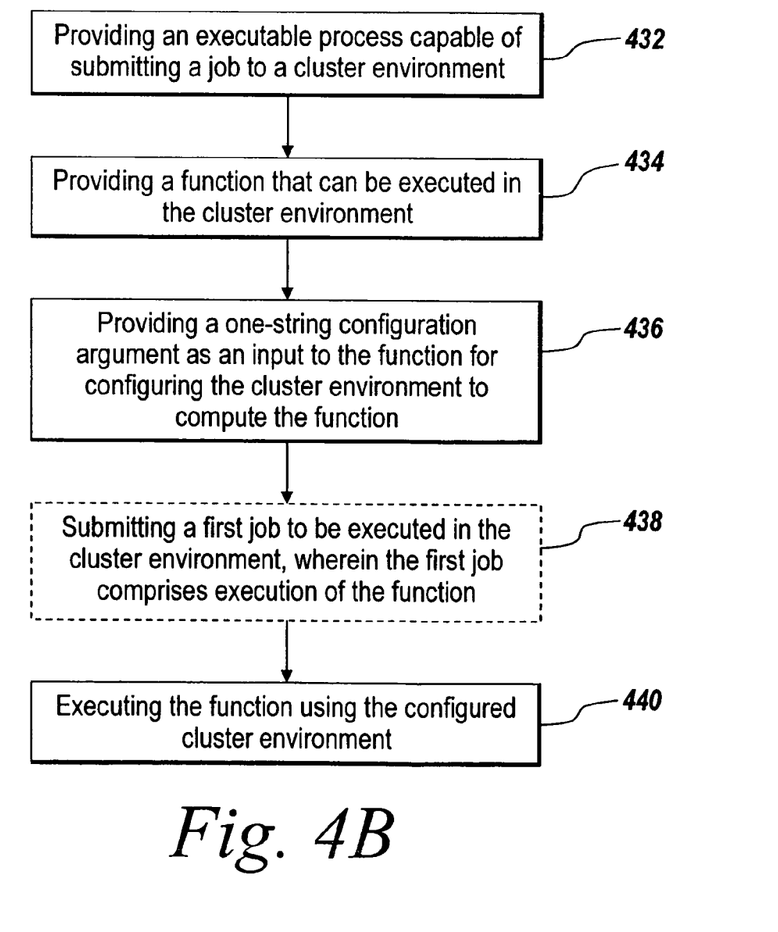
FIG. 4B is a flow chart illustrating the steps taken to practice yet another embodiment of the present invention in a cluster environment.

FIG. 4B illustrates the steps taken to practice one embodiment of the present invention. In step 432, an executable process capable of submitting a job to a cluster environment is provided. In step 434, a function that can be executed in a cluster environment is also provided. A one-string configuration argument is provided as an input to the function for configuring the cluster environment to compute the function in step 436. The function may be optionally included in a job and the job may be submitted to be executed in the cluster environment in step 438. In step 440, the function is executed using the configured cluster environment.

Once a configuration is used either at start up of an application or in a function call, the configuration is further applied to objects that are created for use in the concurrent computing environment. Object methods can accept the single string configuration argument and extracts information from the configuration argument. A configuration may include information that is both relevant and irrelevant to a specific object method. For each method and function that can accept a configuration as an argument, the method or function is capable of identifying which property-value (PV) pairs stored in the configuration is relevant to the method or function. In one embodiment of the present invention, each PV pair stored in a configuration is associated with a section that identifies a specific function or method to which the PV pair should be applied to. For example, a configuration can be implemented as a file that contains three columns of data where the first column is a section column, the second column is a property column, and the third column a value column. In this manner, a specific object method or a function can easily identify the relevant section and use only the PV pairs in the relevant section with the object method or function. In one aspect of the present invention, different types of objects can use the same setting specified in the configuration. For example, different types of job objects can be utilized in the present invention, where the setting for a job object is specified in the configuration under a common job section. In another aspect of the present invention, different types of objects can use different settings specified under different sections in the configuration. One of ordinary skill in the art will appreciate that the present invention is not limited to the specific exemplary implementation discussed herein and many modifications can be made without departing from the spirit and scope of the present invention.

In one embodiment, a configuration with one or more PV pairs is provided to a function or an object method. The function or the object method can extract the relevant PV pairs found in the configuration and puts the PV pairs into the place where the configuration was specified in the argument list. For example, in a function call to find computing resources (findResource) to use in the concurrent computing environment assuming the configuration (named 'myconfig') stores a single PV pair for the findResource method/section such as follows:

'Name'='myjobmanager'

Then the function call to findResource method using the configuration named 'myconfig' may look like the following expression sched=findResource('scheduler', . . . , 'configuration', 'myconfig', . . . );

which is expanded to and replaced with the following expression sched=findResource('scheduler', . . . , 'Name', 'myjobmanager', . . . );

In one embodiment of the present invention, after findResource function is given a configuration argument, findResource invokes a second function to find out which PV pairs in the configuration is applicable. The second function returns the relevant PV pairs to the findResource function and then findResource function places the relevant PV pairs in the argument list in place of the configuration argument. An object method can also accept a configuration argument and retrieves the relevant PV pairs to apply to one or more properties of an object. For example, given a scheduler object named sched and a desirable configuration named myconfig, a set method of the scheduler object using the desired configuration can look like the following:

set(sched, 'congifuration', 'myconfig');

In a further embodiment of the present invention, each function and object method that can accept more than one configuration argument, such as sched=findResource('scheduler', . . . , 'configuration', 'myconfig1', 'configuration', 'myconfig2', . . . );

where both myconfig1 and myconfig2 are provided as configuration input arguments. The function or object method again extracts relevant PV pairs from each configuration and apply the PV pairs to the function or object method. If there is conflicting information regarding any configurable properties, the last value that a configuration property is assigned to will be effective. In the example given above, a property in a PV pair in myconfig2 will overwrite any value the property was assigned to in myconfig1.

Figure 6:
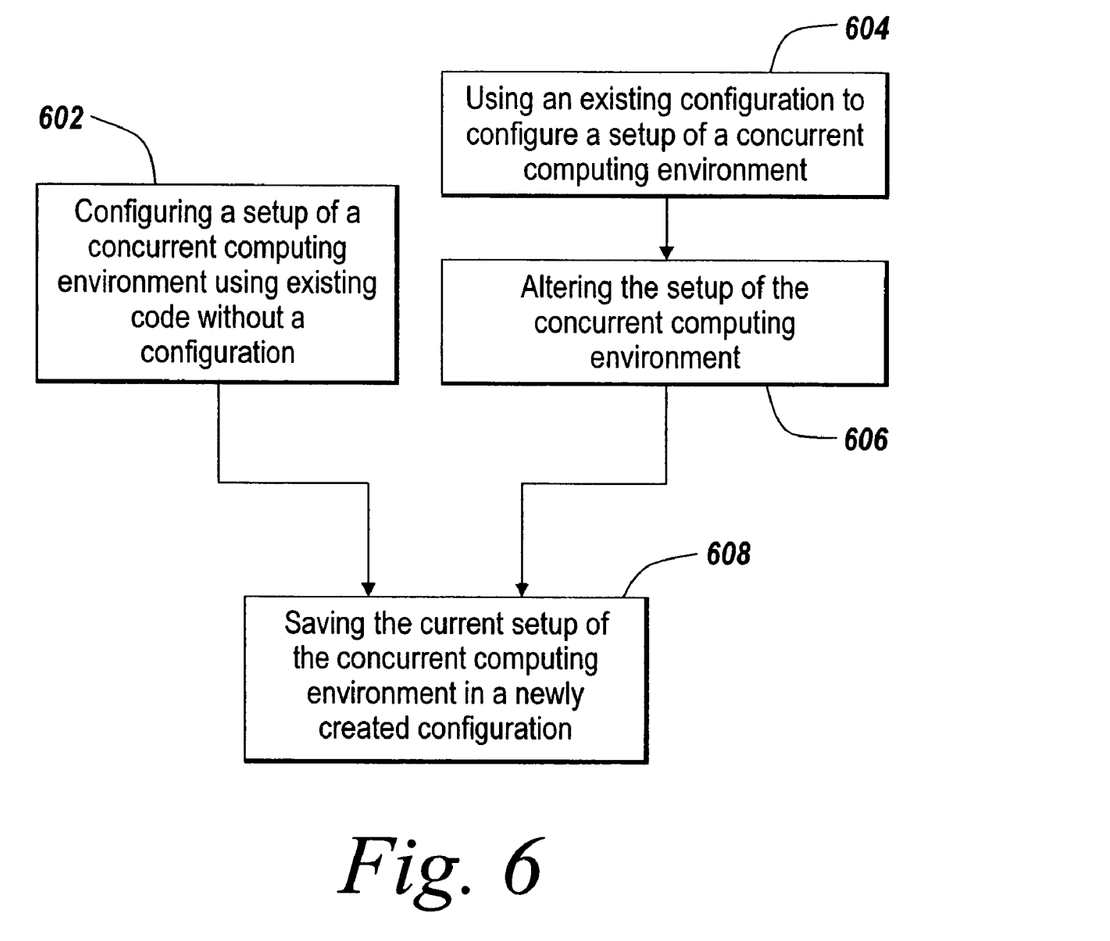
FIG. 6 illustrates a flow chart showing the steps taken to practice one embodiment of the present invention

FIG. 6 illustrates a flowchart showing steps taken to practice another embodiment of the present invention. In one aspect of the present invention, a setup of a concurrent computing environment is configured using existing code without the use of a configuration in step 602. A new configuration can be created in step 608 to save the current setup of the concurrent computing environment. In another aspect of the present invention, a setup of a concurrent computing environment is configured using an existing configuration in step 604. The setup of the concurrent computing environment is then altered in step 606. The setup of the concurrent computing environment can be altered using, but not limited to, explicit code, another existing configuration, or a change of a property or preference of the concurrent computing environment. After the setup of the concurrent computing environment is altered, a new configuration can be created to store the current setup of the concurrent computing environment in step 608.

A configuration may be created from an existing setup of a concurrent computing environment. The advantage of this feature of the present invention is that users do not need to alter or rewrite their existing code including a setup for a concurrent computing environment. A configuration may be created from the existing code and the configuration can be saved for future use. In one embodiment of the present invention, the existing code is read and configuration information of the concurrent computing environment is extracted to create a configuration. In another embodiment of the present invention, the existing code is executed such that a concurrent computing environment is setup and a configuration is created using configuration information gathered from querying the setup of the existing concurrent computing environment. Additionally, a user may initially use a configuration to setup a concurrent computing environment and subsequently change the setup of the concurrent computing environment by some explicit code, after which the user may choose to save the altered setup by creating a configuration storing configuration information of the altered setup.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A method of simplifying computing environment settings for a function, the method comprising:
providing an executable process that submits a lob to a cluster environment; receiving a function to be executed in the cluster environment, wherein the function represents a job to be executed; configuring a concurrent environment for the execution of the function, when the function is provided with a configuration argument as an input to the function, executing the function locally when no configuration argument is provided as an input to the function; the function producing a result or an error when executed; providing a configuration argument to the function as an input to the function, the configuration argument including a configuration name and specifying a setup for the cluster environment for executing the function in the cluster environment without requiring modification to the function prior to executing the function in the cluster environment, wherein the configuration argument is part of a string that includes an identifier for the function and where the configuration argument is the only input for configuring the cluster environment prior to executing the function; and executing the function using the configured cluster environment to produce the result or the error.

2. The method of claim 1 further comprising: providing a second configuration argument as an input to the function.

3. In a computing device, a computer-readable storage medium storing executable instructions, that when executed establish computing environment settings for a function, the medium storing one or more instructions for: providing an executable process that submits a job to a cluster environment; receiving a function to be executed in the cluster environment, wherein the function represents a lob to be executed; configuring a concurrent environment for the execution of the function, when the function is provided with a configuration argument as an input to the function, executing the function locally when no configuration argument is provided as an input to the function; the function producing a result or an error when executed; providing a configuration argument to the function as an input to the function, the configuration argument including a configuration name and specifying a setup for the cluster environment for executing the function in the cluster environment without requiring modification to the function prior to executing the function in the cluster environment, wherein the configuration argument is part of a string that includes an identifier for the function and where the configuration argument is the only input for configuring the cluster environment prior to executing the function; and executing the function using the configured cluster environment to produce the result or the error.

4. The medium of claim 3, storing one or more instructions for: providing a second configuration argument as an input to the function.

* * * * *

UNITED STATES PATENT AND TRADEMARK OFFICE
CERTIFICATE OF CORRECTION

| | | |
|---|---|---|
| PATENT NO. | : 7,634,530 B2 | Page 1 of 1 |
| APPLICATION NO. | : 11/271009 | |
| DATED | : December 15, 2009 | |
| INVENTOR(S) | : Loren Dean et al. | |

It is certified that error appears in the above-identified patent and that said Letters Patent is hereby corrected as shown below:

At column 14, line 18 (Claim 3), of the printed patent, please change "lob" to --job--

Signed and Sealed this

Sixteenth Day of March, 2010

David J. Kappos
*Director of the United States Patent and Trademark Office*